(12) United States Patent  
Natori et al.

(10) Patent No.: US 12,392,373 B2
(45) Date of Patent: Aug. 19, 2025

(54) ROLLING BEARING

(71) Applicant: NSK LTD., Tokyo (JP)

(72) Inventors: Masahide Natori, Tokyo (JP); Hiroki Komata, Tokyo (JP)

(73) Assignee: NSK Ltd., Tokyo (JP)

(*) Notice: Subject to any disclaimer, the term of this patent is extended or adjusted under 35 U.S.C. 154(b) by 75 days.

(21) Appl. No.: 18/683,986

(22) PCT Filed: May 27, 2022

(86) PCT No.: PCT/JP2022/021811
§ 371 (c)(1),
(2) Date: Feb. 15, 2024

(87) PCT Pub. No.: WO2023/026621
PCT Pub. Date: Mar. 2, 2023

(65) Prior Publication Data
US 2024/0352973 A1 Oct. 24, 2024

(30) Foreign Application Priority Data

Aug. 24, 2021 (JP) ................. 2021-136612

(51) Int. Cl.
*F16C 33/62* (2006.01)
*C21D 1/32* (2006.01)
(Continued)

(52) U.S. Cl.
CPC ............... *F16C 33/62* (2013.01); *C21D 1/32* (2013.01); *C21D 9/40* (2013.01); *C22C 38/001* (2013.01);
(Continued)

(58) Field of Classification Search
CPC ....... C22C 38/001; C22C 38/02; C22C 38/04; C22C 38/18; C22C 38/20; C22C 38/22; C22C 38/24; C22C 38/26; C22C 38/40; C22C 38/42; C22C 38/44; C22C 38/46; C21D 1/32; C21D 9/00; C21D 9/40;
(Continued)

(56) References Cited

U.S. PATENT DOCUMENTS 4,581,079 A * 4/1986 Borik ...................... C22C 38/22
148/334
7,189,171 B2 3/2007 Takemura et al.
(Continued)

FOREIGN PATENT DOCUMENTS

CN 1702184 A 11/2005
CN 102906470 A * 1/2013 ............. C22C 38/02
(Continued)

OTHER PUBLICATIONS

Extended European Search Report issued in European Application No. 22860917.8 dated Nov. 18, 2024 (8 pages).
(Continued)

*Primary Examiner* — Phillip A Johnson
(74) *Attorney, Agent, or Firm* — Crowell & Moring LLP

(57) ABSTRACT

A rolling bearing contains a structure having a solid solution carbon amount in a martensitic structure after heat treatment of 0.35 mass % or more and 0.65 mass % or less and a volume ratio of spheroidized carbides having a diameter of 200 nm or more of 4.5% or less.

5 Claims, 2 Drawing Sheets

(51) Int. Cl.

| | |
|---|---|
| *C21D 9/40* | (2006.01) |
| *C22C 38/00* | (2006.01) |
| *C22C 38/02* | (2006.01) |
| *C22C 38/04* | (2006.01) |
| *C22C 38/20* | (2006.01) |
| *C22C 38/22* | (2006.01) |
| *C22C 38/42* | (2006.01) |
| *C22C 38/44* | (2006.01) |
| *C22C 38/46* | (2006.01) |
| *F16C 33/64* | (2006.01) |

(52) U.S. Cl.
CPC .............. *C22C 38/02* (2013.01); *C22C 38/04* (2013.01); *C22C 38/20* (2013.01); *C22C 38/22* (2013.01); *C22C 38/42* (2013.01); *C22C 38/44* (2013.01); *C22C 38/46* (2013.01); *F16C 33/64* (2013.01); *C21D 2211/008* (2013.01); *F16C 2202/04* (2013.01); *F16C 2204/64* (2013.01); *F16C 2204/70* (2013.01); *F16C 2223/10* (2013.01)

(58) Field of Classification Search
CPC .... C21D 2210/008; F16C 33/62; F16C 33/64; F16C 2202/04; F16C 2204/64; F16C 2204/70; F16C 2223/10; F16C 2223/12; F16C 2223/14
See application file for complete search history.

(56) References Cited

U.S. PATENT DOCUMENTS

| | | | |
|---|---|---|---|
| 2004/0132598 A1 | 7/2004 | Goto et al. | |
| 2005/0045248 A1 | 3/2005 | Otani et al. | |
| 2005/0257860 A1 | 11/2005 | Takayama | |
| 2006/0081314 A1* | 4/2006 | Iwamoto | C22C 38/60 |
| | | | 148/334 |
| 2007/0284020 A1* | 12/2007 | Harada | C22C 38/22 |
| | | | 420/101 |
| 2008/0149229 A1 | 6/2008 | Takayama | |
| 2008/0202652 A1 | 8/2008 | Takayama et al. | |
| 2013/0189147 A1 | 7/2013 | Hirai et al. | |
| 2013/0224065 A1 | 8/2013 | Hirai et al. | |

FOREIGN PATENT DOCUMENTS

| | | | | |
|---|---|---|---|---|
| CN | 103620275 A | * | 3/2014 | ............ C22C 38/22 |
| JP | 46-19425 B1 | | 5/1971 | |
| JP | 2002-257144 A | | 9/2002 | |
| JP | 2004-60797 A | | 2/2004 | |
| JP | 2004339575 A | * | 12/2004 | ............ F16C 33/64 |
| JP | 2005-68453 A | | 3/2005 | |
| JP | 2005-147352 A | | 6/2005 | |
| JP | 2006291250 A | * | 10/2006 | |
| JP | 2012163204 A | * | 8/2012 | |
| JP | 5018995 B1 | | 9/2012 | |
| JP | 5803618 B2 | | 11/2015 | |
| JP | 2016-69695 A | | 5/2016 | |
| JP | 6481652 B2 | | 3/2019 | |
| JP | 6639839 B2 | | 2/2020 | |
| JP | 6846901 B2 | | 3/2021 | |
| JP | 2021-88751 A | | 6/2021 | |

OTHER PUBLICATIONS

International Preiiminary Report on Patentabiiity (PCT/IB/338 & PCT/IB/373) issued in PCT Application No. PCT/JP2022/021811 dated Mar. 7, 2024, including Engiish translation of Written Opinion (PCT/ISA/237) (5 pages).

International Search Report (PCT/ISA/210) issued in PCT Application No. PCT/JP2022/021811 dated Aug. 2, 2022, with English translation (5 pages).

Japanese-language Written Opinion (PCT/ISA/237) issued in PCT Application No. PCT/JP2022/021811 dated Aug. 2, 2022, with English translation (9 pages).

\* cited by examiner

ROLLING BEARING

TECHNICAL FIELD

The present invention relates to a rolling bearing.

BACKGROUND ART

In a rolling bearing, metal fatigue occurs due to prolonged use under a load, resulting in the raceway surface spalling in some times. As the mechanism of the raceway surface spalling, "inside starting spalling" and "surface starting spalling" are conventionally well known. The "inside starting spalling" is a phenomenon in which stress concentration occurs around non-metal inclusions inside a material, and fatigue cracks are generated with the stress concentration as the starting point, leading to the spalling.

The "surface starting spalling" is a phenomenon in which foreign matter mixed in a lubricating oil causes an indentation on the raceway surface, stress is concentrated on the edge of the indentation, and fatigue cracks are generated with the stress concentration as the starting point, leading to the spalling.

However, in some uses, the decomposition of the lubricating oil generates hydrogen, and the generated hydrogen enters steel and causes a change in the metallographic structure in some cases. When the change in the metallographic structure occurs, fatigue cracks are generated from the interface between the structure changed portion and a normal portion, and spalling occurs, and therefore the life of the rolling bearing significantly decreases. The metallographic structure change is a phenomenon in which martensite as a base structure of bearing steel is transformed into fine ferrite particles by the entering hydrogen. When the rolling bearing causing the metallographic structure change is etched and the metallographic structure is observed, the structure changed portion appears white. Therefore, such a structure is also referred to as a "white structure" or the like. In the following description, the spalling due to the white structure is referred to as "white structure spalling". The white structure spalling arises through a mechanism different from the mechanisms of the "inside starting spalling" and the "surface starting spalling" described above, and therefore measures to suppress the occurrence of the spalling are completely different.

As the measures against the white structure spalling, a steel material added with a large amount of Cr is used as described in PTL 1, for example. However, the addition of a large amount of Cr makes the steel material brittle in a process of manufacturing the steel material, and, further, the quenching temperature to achieve the required hardness is required to increase in a process of manufacturing the bearing, which reduces the productivity in the manufacturing of the bearing. PTLS 2 to 4 adjust not only the Cr amount but the C amount, the Si amount, the Mn amount, and the Mo amount, thereby suppressing the occurrence of the white structure spalling while maintaining the productivity.

Further, PTL 5 optimally distributes Cr to the base structure and carbides, thereby strengthening both the martensitic structure in the base and spheroidized carbides and delaying the formation of the white structure.

PTLS 6, 7 focus on the amounts of Si, Mn, Cr, Ni, and Mo forming solid solutions in the base structure, and provide a high cleanliness bearing steel having an excellent rolling contact fatigue life in environments where hydrogen enters steel materials, without depending on technologies leading to carbide precipitation reducing the rolling contact fatigue properties or a significant material cost increase.

CITATION LIST

Patent Literatures

PTL 1: JP 2005-147352 A
PTL 2: JP 5018995 B
PTL 3: JP 5803618 B
PTL 4: JP 6481652 B
PTL 5: JP 2016-069695 A
PTL 6: JP 6639839 B
PTL 7: JP 6846901 B

SUMMARY OF INVENTION

Technical Problem

However, the technologies disclosed in PTLS 1 to 7 do not sufficiently suppress the occurrence of the white structure spalling, and therefore a technology capable of further suppressing the occurrence of the white structure spalling has been demanded.

Thus, the present invention has been made in view of the above-described problems. It is an object of the present invention to provide a rolling bearing capable of suppressing the occurrence of the white structure spalling.

Solution to Problem

One aspect of the present invention provides a rolling bearing having a structure of a front surface including at least a rolling contact surface, the structure containing a structure having a solid solution carbon amount in a martensitic structure after heat treatment of 0.35 mass % or more and 0.65 mass % or less and a volume ratio of spheroidized carbides having a diameter of 200 nm or more of 4.5% or less.

Advantageous Effects of Invention

One aspect of the present invention provides a rolling bearing capable of suppressing the occurrence of the white structure spalling.

DESCRIPTION OF EMBODIMENTS

A detailed description below describes an embodiment of the present invention. The embodiment described below exemplifies devices and methods for embodying the technical idea of the present invention. The technical idea of the present invention does not specify materials, structures, arrangement, and the like of constituent components to the materials, structures, arrangement, and the like described below. The technical idea of the present invention can be variously altered within the technical range defined by Claims.

With respect to the use of a rolling bearing in which a white structure is generated during the use of the roller beading, leading to early spalling, the present inventors have focused on the state of a structure obtained after heat treatment, particularly the amounts of elements forming solid solutions in a martensitic structure and spheroidized carbides, and have found that the generation of the white structure can be suppressed by appropriately controlling the amounts of the elements forming solid solutions in the martensitic structure and spheroidized carbides.

<Rolling Contact Fatigue Life Test>

Herein, prior to the present invention, the present inventors have conducted a rolling contact fatigue life test with different additive elements, such as C, Cr, Mn, forming solid solutions in a base of the rolling bearing. In this test, inner rings and outer rings for deep groove ball bearing 6206 were first produced by turning steel materials having the alloy compositions shown in Table 1. In Table 1, the unit of O is mass ppm, and the unit of elements other than O is mass %. Subsequently, the produced inner rings and outer rings were subjected to quenching treatment or induction heat treatment, followed by tempering treatment. Further, the treated inner rings and outer rings were polished to have a finished shape, and then combined with a SUJ2 ⅜-inch steel ball and a resin cage to produce test bearings. Then, the test bearings were mounted in a radial type life tester to be subjected to a rolling contact fatigue life test under the following conditions. This test was performed seven times, and the mean value of the life where the cumulative probability of failure reaches 50% (L50) was determined.

Figure 1:
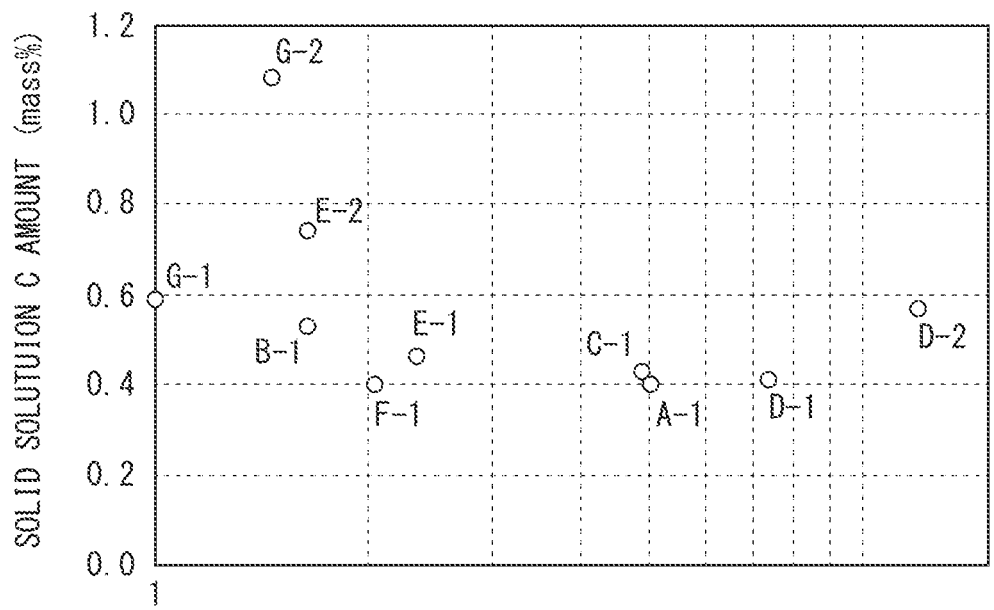
FIG. 1 is a graph showing the relationship between the amount of C forming a solid solution in a martensitic structure and the life ratio between each sample and a G-1 product.
Figure 2:
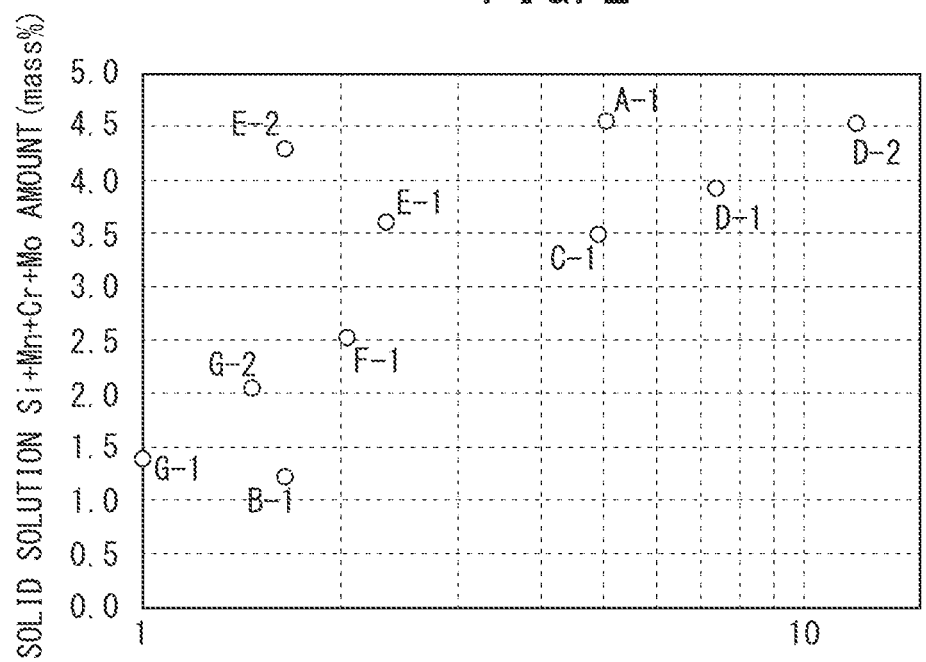
FIG. 2 is a graph showing the relationship between the total amount of Si, Mn, Cr, and Mo forming solid solutions in the martensitic structure and the life ratio between each sample and the G-1 product.
Figure 3:
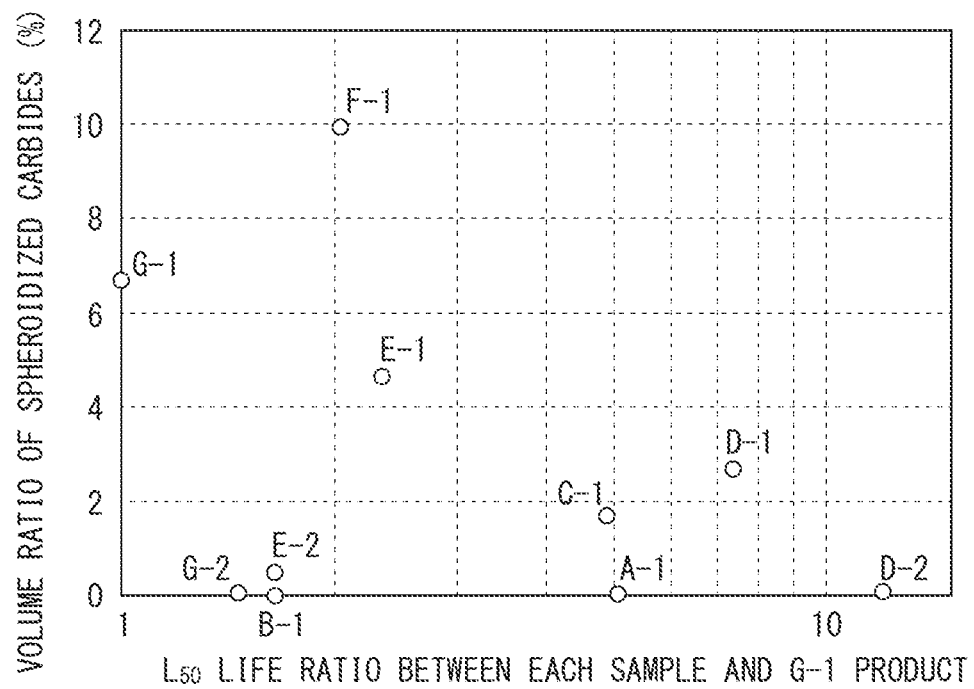
FIG. 3 is a graph showing the relationship between the volume ratio of spheroidized carbides and the life ratio between each sample and the G-1 product.

Test load (radial load): 910 kgf
Rotation speed: 3000 min$^{-1}$
Lubricating oil: Special lubricating oil likely to generate hydrogen through decomposition of lubricating oil Table 2 shows the amounts of C, Si, Mn, Cr, and Mo forming solid solutions in the martensitic structure after the heat treatment, the volume ratio of carbides, the hardness, the residual austenite amount YR, and the rolling contact fatigue life test results. In Table 2, the unit of the solid solution C, the solid solution Si, the solid solution Mn, the solid solution Cr, and the solid solution Mo, which are the amounts of C, Si, Mn, Cr, and Mo forming solid solutions, is mass % and the unit of the residual austenite is vol %. The amounts of solid solution elements in the martensitic structure were calculated by measuring the volume ratio of spheroidized carbides and the amount of each solid solution element in the spheroidized carbides by the EDS analysis, followed by subtraction from the addition amount of each element contained in the steel. The number of the generated white structures is indicated by (Number of bearings in which the white structure was observed)/(Number of bearings subjected to the rolling contact fatigue test). The volume ratio of carbides is intended for carbides having a diameter of 200 nm or more. The alphabet of each sample No. corresponds to the alphabet of each steel material No. Q in the heat treatment column indicates quenching treatment, and IH indicates induction hardening treatment. FIGS. 1 to 3 show the results of organizing the life ratio between each sample and G-1, which is a standard heat-treated product of a SUJ2 material, in terms of the amount of C forming a solid solution in the martensitic structure, the total amount of alloy elements other than C forming a solid solution, and the volume ratio of carbides, respectively. The volume ratio can be determined from the area ratio appearing in the cross section because an object to be measured is substantially spherical, and is substantially the same value (ratio) as the area ratio.

TABLE 2

| Sample No. | Heat treatment | Solid solution C | Solid solution Si | Solid solution Mn | Solid solution Cr | Solid solution Mo | Volume ratio of carbides | Hardness | $\gamma_R$ | Number of generated white structures | $L_{50}$ life | Life ratio between each sample and G-1 |
|---|---|---|---|---|---|---|---|---|---|---|---|---|
| A-1 | Q950° C. | 0.40 | 0.44 | 0.79 | 2.97 | 0.35 | 0.07% | 623 HV | 6 | 0/7 | 726 hr | 5.0 |
| B-1 | IH | 0.53 | 0.18 | 0.87 | 0.15 | 0.02 | 0.00% | 720 HV | 8 | 0/7 | 237 hr | 1.6 |
| C-1 | Q840° C. | 0.43 | 0.65 | 1.11 | 1.45 | 0.28 | 1.71% | 713 HV | 8 | 0/7 | 701 hr | 4.9 |
| D-1 | Q880° C. | 0.41 | 0.44 | 0.76 | 2.43 | 0.29 | 2.71% | 644 HV | 6 | 0/7 | 1060 hr | 7.4 |
| D-2 | Q950° C. | 0.57 | 0.44 | 0.79 | 2.95 | 0.35 | 0.10% | 700 HV | 13 | 0/7 | 1728 hr | 12.0 |
| E-1 | Q880° C. | 0.46 | 0.44 | 0.75 | 2.15 | 0.26 | 4.65% | 712 HV | 12 | 1/7 | 337 hr | 2.3 |
| E-2 | Q950° C. | 0.74 | 0.44 | 0.66 | 2.86 | 0.34 | 0.50% | 716 HV | 27 | 7/7 | 237 hr | 1.6 |
| F-1 | Q840° C. | 0.40 | 0.43 | 0.66 | 1.22 | 0.21 | 9.97% | 714 HV | 11 | 1/7 | 293 hr | 2.0 |
| G-1 | Q840° C. | 0.59 | 0.22 | 0.33 | 0.84 | 0.01 | 6.68% | 720 HV | 11 | 7/7 | 144 hr | 1.0 |
| G-2 | Q950° C. | 1.06 | 0.23 | 0.38 | 1.41 | 0.04 | 0.05% | 688 HV | 25 | 7/7 | 211 hr | 1.5 |

TABLE 1

| Steel maternal No. | C | Si | Mn | P | S | Cr | Mo | Cu | O |
|---|---|---|---|---|---|---|---|---|---|
| A | 0.40 | 0.44 | 0.79 | 0.015 | 0.001 | 2.99 | 0.35 | 0.09 | 4 |
| B | 0.53 | 0.18 | 0.87 | 0.013 | 0.013 | 0.15 | 0.02 | 0.11 | 8 |
| C | 0.53 | 0.65 | 1.22 | 0.021 | 0.001 | 2.10 | 0.35 | 0.08 | 10 |
| D | 0.58 | 0.44 | 0.79 | 0.013 | 0.001 | 2.97 | 0.36 | 0.10 | 4 |
| E | 0.79 | 0.44 | 0.79 | 0.014 | 0.001 | 2.99 | 0.35 | 0.10 | 4 |
| F | 1.03 | 0.46 | 0.80 | 0.014 | 0.001 | 3.05 | 0.35 | 0.09 | 4 |
| G | 1.07 | 0.23 | 0.38 | 0.008 | 0.002 | 1.41 | 0.04 | 0.09 | 5 |

The results of investigating whether the white structure was generated focusing on the elements forming solid solutions in the martensitic structure showed that the amount of C forming a solid solution in the martensitic structure and the volume ratio of spheroidized carbides affect the generation of the white structure irrespective of the amounts of Si, Mn, Cr, and Mo forming solid solutions (Table 2). For example, in the sample E-2 in which a large amount of Cr formed a solid solution (2.86 mass %) in the martensitic structure, the white structure is generated in all of the bearings, while the white structure is not observed irrespective of the amounts of Si, Mn, Cr, and Mo in the structures having the solid solution C amount of 0.65 mass % or less and the volume ratio of spheroidized carbides of 4.5% or less as in the samples A-1, B-1, C-1, D-1, and D-2. On the other hand, it is found that, in the case of the sample B-1 in which the amounts of Si, Mn, Cr, and Mo forming solid solutions are equal to or less than those of the comparative material G-1, the life is somewhat extended, but the sample B-1 does not have the life extension effect as compared with the other samples A-1, C-1, D-1, and D-2. This is considered to be because Si, Mn, Cr, and Mo forming solid solutions in the martensitic structure affects the generation or the propagation of cracks.

The results above show that, as the measures against the white structure spalling due to the entrance of hydrogen, it is essential that the amount of carbon forming a solid solution in the martensitic structure after the heat treatment is 0.35 mass % or more and 0.65 mass % or less and that the volume ratio of spheroidized carbides having a diameter of 200 nm or more is 4.5% or less. As the lower limit of the solid solution carbon amount, the amount of C required to achieve the minimum hardness of 650 HV required for the bearing can be determined by the method described in "Materials Science and Engineering: A Vol. 273-275, No. 15, P. 40-57 (1999), Title: Martensite in steel: strength and structure)". As the amounts of the solid solution elements other than C, the total solid solution amount of at least Si, Mn, Cr, and Mo is preferably 1.0 mass % or more and more preferably 2.0 mass % or more. The life extension effect can be further obtained by forming the structure in which the amounts of the solid solution elements other than C are set in such a range. The elements in which the solid solution amounts are specified as described above as the solid solution elements other than C may include N, Ni, V, and Cu, for example, besides Si, Mn, Cr, and Mn. Further, this investigation evaluated the bearings subjected to the quenching treatment or the induction hardening treatment, and then subjected to the tempering treatment. However, heat treatment methods other than the heat treatment methods above, e.g., carburizing treatment or carbonitriding treatment, may be acceptable.

<Rolling Bearing>

More specifically, the rolling bearing according to one aspect of the present invention is based on the findings above. The rolling bearing according to this embodiment has a structure of a front surface including at least a rolling contact surface, the structure containing the structure having the solid solution carbon amount in the martensitic structure after heat treatment of 0.35 mass % or more and 0.65 mass % or less and the volume ratio of spheroidized carbides having a diameter of 200 nm or more of 4.5% or less. The front surface of the rolling bearing where the solid solution carbon amount and the volume ratio of spheroidized carbides are specified is the hardened region of the rolling bearing and is set as appropriate according to uses or standards, e.g., within 1 mm from the front surface. The heat treatment methods for the rolling bearing may be any of quenching treatment, carburizing treatment, carbonitriding treatment, and induction hardening treatment.

Herein, the prior arts as described in the cited references 1 to 7 are not clear about the amount of carbon forming a solid solution in a base structure, and do not control the solid solution carbon amount. However, this embodiment can further suppress the occurrence of the white structure spalling by controlling the solid solution carbon amount and the volume ratio of the spheroidal carbides of the rolling bearing as described above, and thus can obtain an excellent rolling contact fatigue life.

With respect to the above-described structure of the rolling bearing, Si, Mn, Cr, Mo, N, Ni, V, and Cu as elements other iron and carbon form solid solutions in the martensitic structure in a total proportion of preferably 1.0 mass % or more and more preferably 2.0 mass % or more. It is more preferable in the above-described structure of the rolling bearing that the solid solution carbon amount is 0.40 mass % or more and 0.60 mass % or less and the solid solution Cr amount is 2.40 mass % or more and 2.95 mass % or less. It is still more preferable in the structure where the solid solution carbon amount and the solid solution Cr amount are in the ranges above that the hardness of the front surface including at least the rolling contact surface is 640 HV or more. With such a configuration, further extension of the life of the rolling bearing can be realized.

The rolling bearing according to this embodiment is applied as bearings for automobiles, agricultural machinery, construction machinery, steel machinery, direct acting devices, and the like, for example. More specifically, the bearing is suitable for automotive electrical auxiliary equipment and wind power generation equipment, e.g., bearings for alternators, bearings for wind turbines, and the like.

The invention claimed is:

1. A rolling bearing comprising:
a structure of a front surface including at least a rolling contact surface,
the structure containing a structure having a solid solution carbon amount in a martensitic structure after heat treatment of 0.35 mass % or more and 0.65 mass % or less and a volume ratio of spheroidized carbides having a diameter of 200 nm or more of 4.5% or less.

2. The rolling bearing according to claim 1, wherein Si, Mn, Cr, Mo, N, Ni, V, and Cu forming solid solutions in a total proportion of 1.0 mass % or more in the martensitic structure.

3. The rolling bearing according to claim 2, wherein the solid solution carbon amount is 0.40 mass % or more and 0.60 mass % or less, and a solid solution Cr amount is 2.40 mass % or more and 2.95 mass % or less.

4. The rolling bearing according to claim 3, wherein the front surface including at least the rolling contact surface has hardness of 640 HV or more.

5. The rolling bearing according to claim 1, wherein the heat treatment is any of quenching treatment, carburizing treatment, carbonitriding treatment, and induction hardening treatment.

* * * * *